US009867326B2

(12) United States Patent
Dong et al.

(10) Patent No.: US 9,867,326 B2
(45) Date of Patent: Jan. 16, 2018

(54) COLD PLASMA SEED TREATMENT DEVICE

(71) Applicants: INSTITUTE OF SOIL SCIENCE, CHINESE ACADEMY OF SCIENCES, Nanjing (CN); CHANGZHOU ZHONGKE CHANGTAI PLASMA TECHNOLOGY CO., LTD, Xinbei Changzhou, Jiangsu (CN)

(72) Inventors: Yuanhua Dong, Nanjing (CN); Hanliang Shao, Xinbei Changzhou (CN); Qin Miao, Xinbei Changzhou (CN); Haibo Qian, Xinbei Changzhou (CN)

(73) Assignee: INSTITUTE OF SCIENCE, CHINESE ACADEMY OF SCIENCES, Nanjing (CN)

( * ) Notice: Subject to any disclaimer, the term of this patent is extended or adjusted under 35 U.S.C. 154(b) by 207 days.

(21) Appl. No.: 14/649,295

(22) PCT Filed: Mar. 28, 2013

(86) PCT No.: PCT/CN2013/073333
§ 371 (c)(1),
(2) Date: Jun. 3, 2015

(87) PCT Pub. No.: WO2014/086129
PCT Pub. Date: Jun. 12, 2014

(65) Prior Publication Data
US 2015/0327430 A1    Nov. 19, 2015

(30) Foreign Application Priority Data

Dec. 7, 2012 (CN) .......................... 2012 1 0523536

(51) Int. Cl.
*A01C 1/08* (2006.01)
*A01C 1/00* (2006.01)
(Continued)

(52) U.S. Cl.
CPC .................. *A01C 1/08* (2013.01); *A01C 1/00* (2013.01); *B01J 19/088* (2013.01); *H05H 1/46* (2013.01);
(Continued)

(58) Field of Classification Search
None
See application file for complete search history.

(56) References Cited

U.S. PATENT DOCUMENTS 3,765,125 A    10/1973    Amburn

FOREIGN PATENT DOCUMENTS

CN    1363206 A    8/2002
CN    2807733 Y    8/2006
(Continued)

OTHER PUBLICATIONS

International Search Report, mailed Sep. 19, 2013, in reference to PCT/CN2013/073333.

*Primary Examiner* — Kishor Mayekar
(74) *Attorney, Agent, or Firm* — Zareefa B. Flener; Flener IP & Business Law

(57) ABSTRACT

Disclosed is a cold plasma seed treatment device, having a vacuum apparatus, an electric discharging apparatus, and a transport apparatus. The electric discharging apparatus and the transport apparatus are disposed in the vacuum apparatus. The vacuum apparatus is provided with a tube feeding hole and a tube discharging hole. The cold plasma seed treatment device further has a feeding apparatus and a discharging apparatus. The feeding apparatus comprises a first feeding hopper and a second feeding hopper, each of (Continued)

which is provided with a feeding cover, a vent valve, a discharging hole, and a vacuuming butterfly valve. Each of the discharging hole of the feeding hopper and the tube feeding hole are separately connected to a three-way pipe by using a butterfly valve. Each vacuuming butterfly valve is connected to a first vacuuming pump group. The discharging apparatus comprises a first discharging hopper and a second discharging hopper.

10 Claims, 2 Drawing Sheets

(51) Int. Cl.
*B01J 19/08* (2006.01)
*H05H 1/46* (2006.01)

(52) U.S. Cl.
CPC *B01J 2219/0847* (2013.01); *B01J 2219/0869* (2013.01); *B01J 2219/0879* (2013.01); *B01J 2219/0896* (2013.01); *H05H 2001/466* (2013.01); *H05H 2240/20* (2013.01)

(56) References Cited

FOREIGN PATENT DOCUMENTS

| | | |
|---|---|---|
| CN | 1924972 A | 2/2007 |
| CN | 201027675 U | 7/2013 |

COLD PLASMA SEED TREATMENT DEVICE

I. TECHNICAL FIELD

The present invention belongs to the cold plasma seed treatment field, and particularly relates to a cold plasma seed treatment device.

II. BACKGROUND ART

Plasma seed activation treatment and its applications emerged first in Russia. The State Institute of Physics of Russia pioneered to develop plasma seed treatment device for treatment of vegetable seeds, to improve sprouting and to increase yield. In USA and Canada etc., researches on sterilization of crop seeds with plasma were made, so as to inhibit the occurrence of crop diseases and pests. In Ukraine, Israel, Korea, and Japan, researches on plasma treatment for seeds and relevant applications have being started also. In China, the Institute of Dryland Farming, Shanxi Academy of Agricultural Sciences has made researches on plasma seed treatment technology since 1997, and has proved the yield increasing effect and application prospects of seed activation by plasma treatment. Subsequently, Jilin Academy of Agricultural Sciences and some other research institutions made researches on the biological effects and agricultural effects of plasma treatment of various kinds of seeds successively. The test results have demonstrated that the plasma seed activation treatment has a remarkable stimulation effect to the germination, sprouting and growth of various kinds of crop plants, the germination ratio and germination potential can be increased by 5-18%, the root system can be highly developed, the incidences of disease can be reduced, the drought resistance ability can be enhanced, and the yield can be increased by 10-40% among food crops and 15-50% among vegetables.

In year 2002, a up-right type electromagnetic field plasma treatment machine was disclosed in invention patent application CN1383710A and utility model patent application CN2473865Y, wherein, a glass tube filled with mercury vapor was used as a plasma generator, and then is connected to an electro-magnetization chamber. In invention patent application CN1373983A, a method for processing different kinds of crop seeds with the processor disclosed in utility model patent application CN2473865Y was disclosed, including parameters such as treating dose, number of treatment, and appropriate seeding time, etc. In CN1363206A, a lying type plasma seed treatment machine and a treatment method were disclosed, wherein, inductive discharge and capacitive discharge were utilized, in conjunction with appropriate degree of vacuum, to generate plasma, and seeds were activated under a combined effects of low pressure, electric field, magnetic field, ions, electrons, and glow. In year 2004, in CN1500380A, a stationary chamber plasma seed treatment apparatus was disclosed, which employs high voltage discharge needles to produce sharp point discharge, so as to ionize a gas and generate plasma.

In year 2005, we found that cold plasma can interact with the bio-macromolecules of plant seeds and cause energy transition of the bio-macromolecule, i.e., transition from ground state to excited state, and thereby boost the plant seeds to create positive biological effects. The effects were embodied at significantly enhanced physiological activity and expression of potential resistance genes, the vitality and resistance performance of the crop plants were improved. Based on that finding, we invented a lying type "Cold Plasma Seed Treatment Instrument" (invention patent application CN1914972A) and a "Plasma Crop Seed Activation Treatment Apparatus" (utility model patent application CN2807733Y), wherein, a strong glow discharge area was created between two pole plates connected via radio frequency output wires to a radio frequency power source, and glow discharge between the pole plates and the inner wall of the chamber is inhibited through a metal shielding enclosure disposed around the pole plates, as a result, the seed treatment efficiency was greatly improved. In year 2010, a method for plant seeds treatment using plasma and an apparatus thereof were disclosed in invention patent application CN10166 9416A, wherein, cold plasma was generated by dielectric barrier discharge under atmospheric pressure in the air instead of a vacuum environment. A drawback in the invention patents and utility model patents described above is that the seed treatment efficiency is too low to treat seeds in a large quantity. Therefore, it is necessary to create a large-size cold plasma apparatus to meet the demand for mass production of food crops.

III. CONTENTS OF THE INVENTION

Technical Problem

The present invention provides an device that utilizes cold plasma generated from glow discharge in a low vacuum state to treat plant seeds in a large quantity.

IV. TECHNICAL SCHEME

A cold plasma seed treatment device, comprising a vacuum apparatus and an electric discharging apparatus and a transport apparatus disposed in the vacuum apparatus, with a tube feeding hole and a tube discharging hole arranged on the vacuum apparatus, wherein, the cold plasma seed treatment device further comprises a feeding apparatus and a discharging apparatus, the feeding apparatus comprises a first feeding hopper and a second feeding hopper, each of the first feeding hopper and the second feeding hopper is provided with a feeding cover, a vent valve of feeding hopper, a discharging hole of feeding hopper, and a vacuuming butterfly valve of feeding hopper respectively, the discharging hole of feeding hopper of the first feeding hopper, the discharging hole of feeding hopper of the second feeding hopper, and the tube feeding hole are connected to a tube hole of a first three-way pipe via a butterfly valve of feeding hopper respectively; the discharging apparatus comprises a first discharging hopper and a second discharging hopper, each of the first discharging hopper and the second discharging hopper is provided with a feeding hole of discharging hopper, a discharging port of discharging hopper, a vent valve of discharging hopper, and a vacuuming butterfly valve of discharging hopper respectively, the feeding hole of discharging hopper of the first discharging hopper, the feeding hole of discharging hopper of the second discharging hopper, and the tube discharging hole are connected to a tube hole of a second three-way pipe via a butterfly valve of discharging hopper; the vacuuming butterfly valves of feeding hopper of the first feeding hopper and the second feeding hopper is connected to a first vacuuming pumps group, and the vacuuming butterfly valves of discharging hopper of the first discharging hopper and the second discharging hopper is connected to a second vacuuming pumps group.

The transport apparatus comprises an insulated support, a driving roller, a driven roller, a press roller, and a conveying belt, the driving roller and the driven roller are arranged on two ends of the insulated support via a bearing respectively, the conveying belt is arranged on the driving roller and the driven roller, the press roller is arranged on an end of the insulated support via a bearing and presses the conveying belt against the driving roller, the electric discharging apparatus is arranged on the insulated support, and the conveying belt passes through the inner side electric discharging apparatus, the electric discharging apparatus comprises two pole plates i.e. upper-pole plate and lower-pole plate arranged in parallel to each other, each of the pole plates is provided with a metal float shielding enclosure, an insulating material is filled in the space between the pole plate and the metal float shielding enclosure, the spacing between opposite surfaces of the two pole plates is 1.5 cm~10 cm, the conveying belt passes through the space between the two pole plates, and each pole plate is provided with a pole plate connector, which is connected via radio frequency output wires to a radio frequency power source.

The radio frequency power source is a double-output power supply unit comprising an AC power and a voltage transformer, the voltage transformer is grounded only at the primary side, while the output terminal of the secondary side of the voltage transformer is insulation-protected and then connected to the electric discharging apparatus. The working principle of double outputs is similar to the working principle of a conventional voltage transformer, in which the primary side and secondary side are common-grounded for signal or energy transmission stability and anti-interference ability. However, in actual practice, since the imbalance in the radio frequency electric field resulted from common-grounding of the primary side and secondary side cannot be eliminated, self-bias will occur inevitably, resulting in ion bombardment in a direct current field, and conduction current will flow through the two pole plates inevitably. In view of that, in the present invention, the common-grounding link is canceled, and a double-output interface is utilized, the power output from the interface is constant, and has no impact under constant voltage. The shielding protection still employs a grounding approach. The shielding protection for the double outputs in the vacuum chamber is in float state, including the metal float shielding for the pole plates. Thus, electrical discharge can happen only between the two pole plates, and thereby the generation of displacement current is ensured.

Each of the first feeding hopper and the second feeding hopper are still provided with a sight window of feeding hopper respectively; each of the first discharging hopper and the second discharging hopper are still provided with a sight window of discharging hopper respectively.

The first three-way pipe is provided with a first discharging three-way sight window, and the second three-way pipe is provided with a second discharging three-way sight window.

The electric discharging apparatus comprises discharge electrodes and a radio frequency power source, and the discharge electrodes comprise two pole plates (an upper pole plate and a lower pole plate), which are connected to two output terminals of the radio frequency power source respectively.

The vacuum apparatus comprises a tube, the tube feeding hole and the tube discharging hole are arranged on the tube, and the tube is provided with a vent valves, a vacuum gauge tube, a third vacuuming pumps group, and an air intake regulating valve.

Both the butterfly valve of feeding hopper and the butterfly valve of discharging hopper are manual butterfly valves.

V. BENEFICIAL EFFECTS

The device provided in the present invention can treat different kinds of seeds by controlling gas vacuum degree, discharge power, and ionization time, and ultimately can promote the enhancement of physiological activity of seeds and expression of potential resistance factors, reduce the use of chemical fertilizers, and increase the yield of the crop plants. To realize large-scale and quick treatment, double feeding hoppers and double discharging hoppers are designed on the basis of the device disclosed in prior invention patent application CN1914972A, and vacuuming butterfly valve group and pump group are used in combination, so as to implement high-efficiency and quick vacuum pumping and continuum plasma treatment of seeds. The entire process is easy to manipulate and has high repeatability, and thus can realize large-scale seed treatment.

VI. DESCRIPTION OF DRAWINGS

Among the Figures: 1—tube; 2—electric discharging apparatus; 3—conveying belt; 4—vent valve; 5—vacuum gauge tube; 6—sight window; 7—vent valve; 8—tube support; 9, 10—feeding hopper; 11, 12—feeding cover; 13, 14—vent valve of feeding hopper; 15—sight window of feeding hopper; 16, 17, 18—manual butterfly valve of feeding hopper; 19, 20—manual vacuuming butterfly valve of feeding hopper; 21—feeding three-way sight window; 22—manual discharging butterfly valve; 23, 24—manual butterfly valve of discharging hopper; 25—discharging three-way sight window; 26, 27—discharging hopper; 8, 29—vent valve of discharging hopper; 30, 31—manual vacuuming butterfly valve of discharging hopper; 32—discharging three-way sight window; 33, 34—discharging hole; 35—first vacuuming pumps group; 36—second vacuuming pumps group; 37—third vacuuming pumps group; 38—radio frequency power source; 39—air intake regulating valve, 40—transport motor; 41—insulated support; 42—driving roller; 43—driven roller; 44—press roller; 45—pole plate; 46—metal float shielding enclosure; 47—insulating material; 48—pole plate connector; 49—AC power; 50—voltage transformer.

VII. EMBODIMENTS

Hereunder the present invention will be detailed in embodiments with reference to the accompanying drawings.

Figure 1:
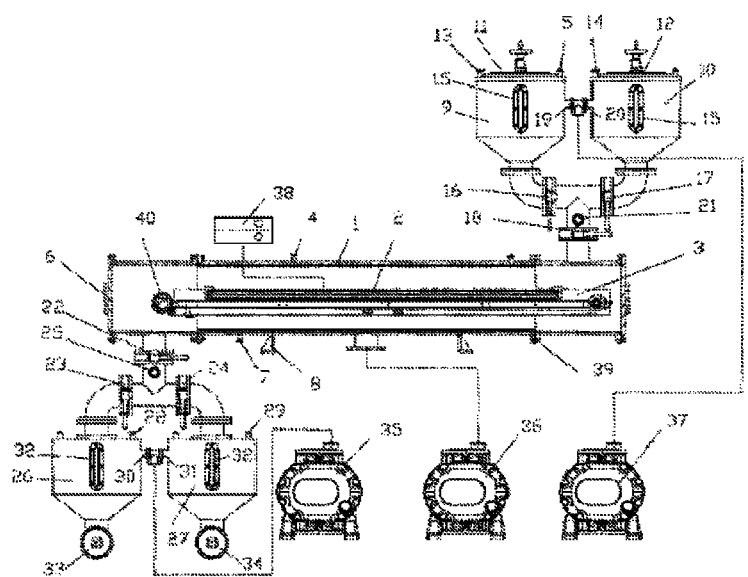
FIG. 1 is a general diagram of the mechanical structure of the present invention.

As shown in FIG. 1, the device disclosed in the present invention comprises a feeding apparatus, a discharging apparatus, a vacuum apparatus, an electric discharging apparatus, and a transport apparatus, wherein:

The feeding apparatus comprises feeding hoppers (9 and 10), feeding covers (11 and 12), vent valves (13 and 14), sight windows of feeding hopper (15 and 21), manual feeding butterfly valves (16, 17, and 18), and vacuuming butterfly valves of feeding hopper (19 and 20). The feeding covers are opened, seeds are filled into the feeding hoppers, and then the feeding covers are closed, the vacuuming butterfly valves of feeding hopper are opened, the vent valves and butterfly valves of feeding hopper are closed, to ensure high leak tightness of the entire feeding apparatus, the sight window of feeding hopper can be used to observe the amount of seeds in the hopper.

The discharging apparatus comprises discharging hoppers (26 and 27), discharging holes (33 and 34), vent valves (28 and 29), discharging three-way sight windows (25 and 32), manual butterfly valves of discharging hopper (22, 23, and 24), and vacuuming butterfly valves of discharging hopper (30 and 31). The vacuuming butterfly valves of discharging hopper are opened, the manual butterfly valves of discharging hopper and vent valves are closed, to ensure high leak tightness of the entire discharging apparatus, the storage amount of seeds in the discharging hopper can be observed through the sight window.

The vacuum apparatus comprises a tube 1, vent valves (4 and 7), a vacuum gauge tube 5, a first vacuuming pumps group 35, a second vacuuming pumps group 36, a third vacuuming pumps group 37, and an air intake regulating valve 39. First, all air intake valves are closed, to ensure high leak tightness of system, then, vacuuming for the entire system is carried out, and the vacuum degree in the system is detected with the vacuum gauge tube, when the system reaches base vacuum degree, the second of vacuuming pumps group 36 and third vacuuming pumps group 37 are closed, the air intake regulating valve is opened to specific degree, and a treatment gas is filled into the tube, so that the tube reaches a preset vacuum degree, and the vacuum degree in the system is kept in dynamic balance.

The electric discharging apparatus 2 comprises two discharging pole plates 45 and a radio frequency power source 38, wherein, the two pole plates 45 are arranged in parallel to each other, each of the pole plates is provided with a metal float shielding enclosure 46, and an insulating material 47 is filled in the space between the pole plate and the metal float shielding enclosure, the spacing between opposite surfaces of the two pole plates is 1.5 cm~10 cm, the conveying belt passes through the space between the two pole plates, and each pole plate is provided with a pole plate connector 48, which is connected to the radio frequency power source 38 via radio frequency output wires. The radio frequency power source 38 is a double-output power supply unit, comprising a AC power supply unit 49 and a voltage transformer 50, wherein, the voltage transformer 50 is grounded only at the primary side, while the output terminal of the secondary side of the voltage transformer is insulation-protected and then connected to the electric discharging apparatus 2. In a low gas pressure environment, the radio frequency power source is opened, and the upper and lower pole plates of the apparatus are connected to a 13.56 MHz double-output radio frequency power source, so as to generate homogenous and steady plasma between the pole plates. Combined with appropriate automatic upper and lower feeding and discharging apparatuses, continuous cold plasma treatment can be realized. In a case that a gas mixture of argon and hydrogen (at 1:3 volume ratio) is used as the working gas, glow discharge can happen in a low vacuum state, so that cold plasma that enables energy transition of bio-macromolecules can be generated, and the energy of active particles in this way can reach as high as 1~20 ev.

The electric discharging apparatus disclosed in the present invention is the only cold plasma generation device that can interact with bio-macromolecules, the pole plate structure in the electric discharging apparatus is improved to add a metal float shielding enclosure and an insulating filling material therein, so as to prevent electrical discharge between any of the pole plates and the inner wall of the chamber, so as to cause the pole plates to generate displacement current, to improve the plasma activity, and to realize the float shielding; which is different from the prior conduction current, the structure in the present invention avoids heat generation generated when electric current passing between the pole plates and the chamber. Hence, the temperature in the device can be controlled within a low temperature range without any additional cooling medium or structure, and the energy density of vacuum ultraviolet light is increased at the same time. By adjusting the spacing between the pole plates, appropriate photon density of vacuum ultraviolet light can be obtained.

Figure 2:
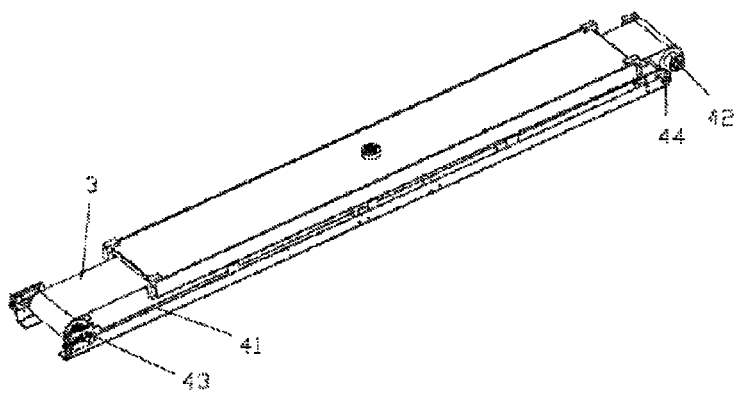
FIG. 2 is a schematic structural diagram of the transport apparatus in the present invention.
Figure 3:
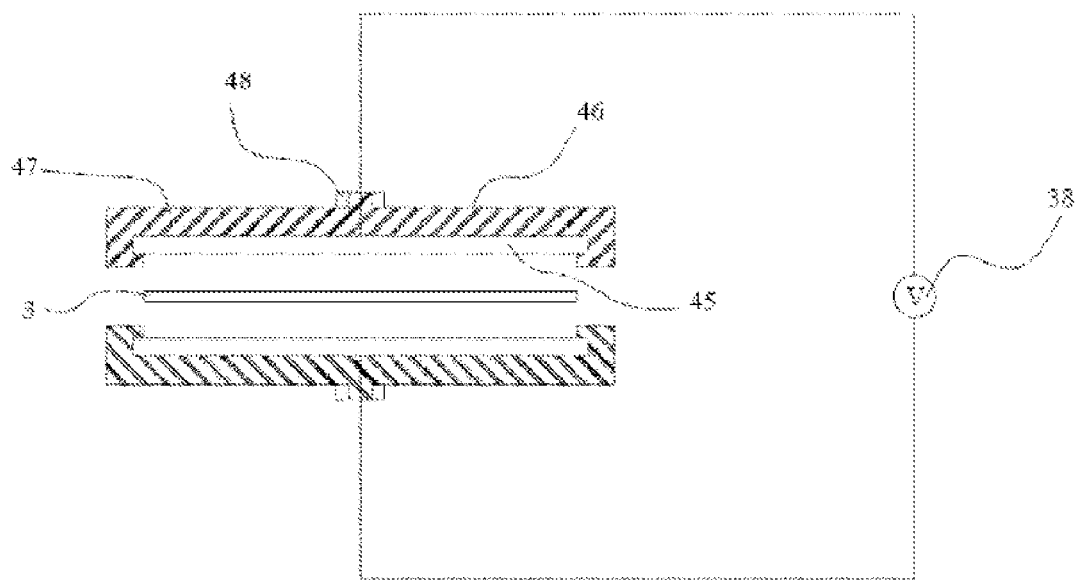
FIG. 3 is a schematic structural diagram of the pole plates of the electric discharging apparatus in the present invention.
Figure 4:
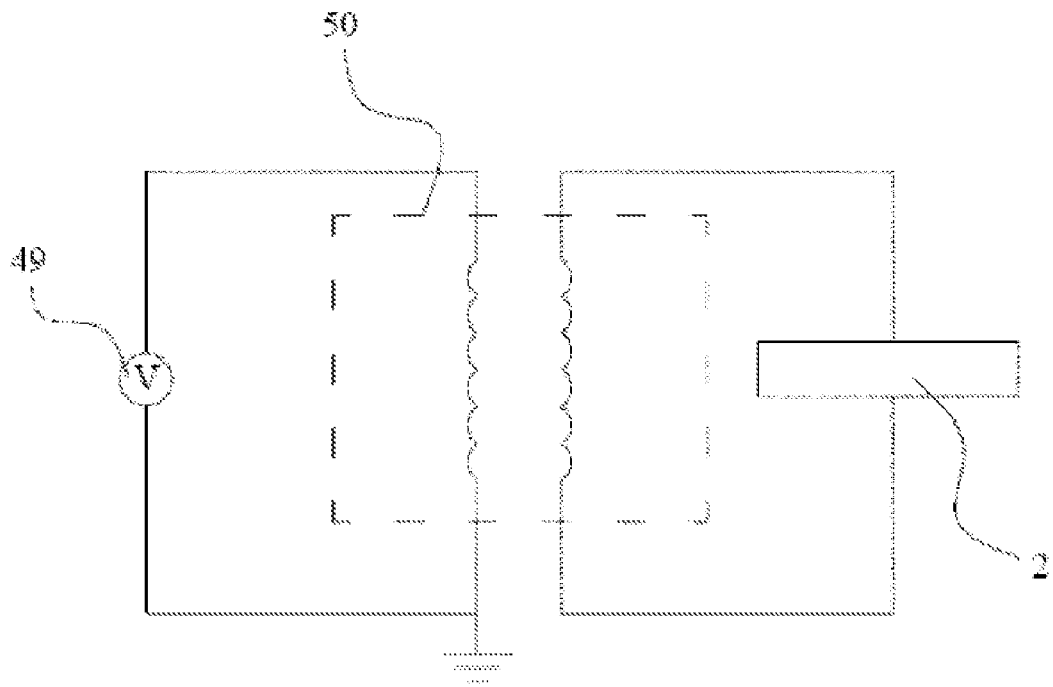
FIG. 4 is a schematic circuit diagram of the power supply apparatus in the present invention.

As shown in FIG. 2, the transport apparatus comprises an insulated support 41, a driving roller 42, a driven roller 43, a press roller 44, a conveying belt 3, and a transport motor 40, seeds in the feeding hopper fall onto the conveying belt, are conveyed into a glow discharge area for treatment, and finally fall into the discharging hopper, and the transport rate of the conveying belt is adjustable, the operation is flexible.

The operations for seed treatment with the device disclosed in the present invention are as follows:

Open the manual vacuuming butterfly valves of feeding hopper (19 and 20) and the manually vacuuming butterfly valves of discharging hopper (30 and 31), and start the pump groups (35, 36, and 37), and ensure the vacuum degrees in the vacuum chambers are the same, open the air intake regulating valve 39, and wait till the gas pressure reaches to a preset value (e.g., 100 Pa). Switch on the power 38 to start the conveying belt 3, open the manual butterfly valve 16 of feeding hopper 9, open the feeding butterfly valve 18, so that the seeds fall onto the conveying belt 3 and are conveyed into the glow discharge area: the seeds (bio-macromolecules) interact with the cold plasma to generate energy transition, i.e., transition from ground state to an excited state, therefore, positive biological effects happen in the seeds.

After the seeds are treated on the conveying belt 3 for several seconds (i.e., treatment time), open the manual discharging butterfly valve 22, and open the manual butterfly valve 23 of discharging hopper 26, so that the treated seeds fall into the discharging hopper 26.

After the feeding from the feeding hopper 9 is completed, close the manual vacuuming butterfly valve 19 of feeding hopper 9 and the manual butterfly valve 16 of feeding hopper 9, and open the vent valve 13 to release the gas completely, then, open the feeding cover 11, load seeds to be treated, and then close the feeding cover 11, next, close the feeding vacuuming butterfly valve 20 and open the manual vacuuming butterfly valve 19, and carry out vacuum pumping to a preset value.

Meanwhile, when the discharging hopper 26 is fully filled with treated seeds, close the manual butterfly valve 23 of the discharging hopper 26 and the vacuuming butterfly valve 30 of the discharging hopper 26, and then open the vent valve 28 to release the gas completely, next, open the discharging cover 33 to discharge the seeds. Then, close the discharging cover 33, close the manual vacuuming butterfly valve 31 of the discharging hopper 27, open the vacuuming butterfly valve 30 of the discharging hopper 27, and carry out vacuum pumping to a preset value.

At the same time, open the manual discharging butterfly valve 24, so that the treated seeds fall into the discharging hopper 27.

By opening the feeding hopper 9, discharging hopper 26, feeding hopper 10 and the discharging hopper 27 cyclically, the purpose of continuous production under a low vacuum state can be realized.

It should be appreciated that the embodiments described above are only provided to interpret the present invention but do not constitute any limitation to the present invention. Any alternation or modification made without departing from the spirit of the present invention shall be deemed as falling into the protected scope of the present invention.

The invention claimed is:

1. A cold plasma seed treatment device, comprising:
a vacuum apparatus with a tube feeding hole and a tube discharging hole arranged on the vacuum apparatus,
an electric discharging apparatus,
a transport apparatus,
a feeding apparatus, and
a discharging apparatus,
wherein, the electric discharging apparatus and the transport apparatus are both disposed in the vacuum apparatus,
the feeding apparatus comprises a first feeding hopper and a second feeding hopper, the first feeding hopper and the second feeding hopper are each provided with a feeding cover, a vent valve of feeding hopper, a discharging hole of feeding hopper, and a vacuuming butterfly valve of feeding hopper, each of the discharging hole of feeding hopper of the first feeding hopper and the discharging hole of feeding hopper of the second feeding hopper, and the tube feeding hole are connected to a tube hole of a first three-way pipe via a butterfly valve of feeding hopper respectively;
the discharging apparatus comprises a first discharging hopper and a second discharging hopper, the first discharging hopper and the second discharging hopper are each provided with a feeding hole, a discharging hole, a vent valve, and a vacuuming butterfly valve, each of the feeding hole of discharging hopper of the first discharging hopper and the feeding hole of discharging hopper of the second discharging hopper, and the tube discharging hole are connected to a tube hole of a second three-way pipe via a butterfly valve of discharging hopper respectively;
the vacuuming butterfly valve of feeding hopper of the first feeding hopper and the second feeding hopper is connected to a first vacuuming pumps group, and the vacuuming butterfly valve of discharging hopper of the first discharging hopper and the second discharging hopper is connected to a second vacuuming pumps group.

2. The cold plasma seed treatment device according to claim 1, wherein, the transport apparatus comprises an insulated support, a driving roller, a driven roller, a press roller, and a conveying belt, the driving roller and the driven roller are arranged on two ends of the insulated support via a bearing respectively, the conveying belt is arranged on the driving roller and the driven roller, the press roller is arranged on an end of the insulated support via a bearing and presses the conveying belt against the driving roller, the electric discharging apparatus is arranged on the insulated support, and the conveying belt passes through inner side of the electric discharging apparatus; the electric discharging apparatus comprises an upper pole plate and a lower pole plate arranged in parallel to each other, each of the pole plates is surrounded by a metal float shielding enclosure defining a space between the plate and the shielding enclosure, wherein the space is filled with an insulating material, wherein opposing surfaces of each of the parallel pole plates are located at a distance of 1.5 cm~10 cm, the conveying belt passes through the space between the two pole plates, and each pole plate is provided with a pole plate connector, which is connected via radio frequency output wires to a radio frequency power source.

3. The cold plasma seed treatment device according to claim 2, wherein, the radio frequency power source is a double-output power supply unit comprising an AC power and a voltage transformer, the voltage transformer is grounded only at a primary side, while the output terminal of a secondary side of the voltage transformer is insulation-protected and then connected to the electric discharging apparatus.

4. The cold plasma seed treatment device according to claim 2, wherein, the first feeding hopper and the second feeding hopper are provided with a sight window of feeding hopper respectively; the first discharging hopper and the second discharging hopper are provided with a sight window of discharging hopper respectively.

5. The cold plasma seed treatment device according to claim 2, wherein, the first three-way pipe is provided with a first discharging three-way sight window, and the second three-way pipe is provided with a second discharging three-way sight window.

6. The cold plasma seed treatment device according to claim 2, wherein, the vacuum apparatus comprises a tube, the tube feeding hole and the tube discharging hole are arranged on the tube, and the tube is provided with vent valves, a vacuum gauge tube, a third vacuuming pumps group, and an air intake regulating valve.

7. The cold plasma seed treatment device according to claim 1, wherein, the first feeding hopper and the second feeding hopper are still provided with a sight window of feeding hopper respectively; the first discharging hopper and the second discharging hopper are still provided with a sight window of discharging hopper respectively.

8. The cold plasma seed treatment device according to claim 1, wherein, the first three-way pipe is provided with a first discharging three-way sight window, and the second three-way pipe is provided with a second discharging three-way sight window.

9. The cold plasma seed treatment device according to claim 1, wherein, the vacuum apparatus comprises a tube, the tube feeding hole and the tube discharging hole are arranged on the tube, and the tube is provided with vent valves, a vacuum gauge tube, a third vacuuming pumps group, and an air intake regulating valve.

10. The cold plasma seed treatment device according to claim 1, wherein, both the butterfly valve of feeding hopper and the butterfly valve of discharging hopper are manual butterfly valves.

* * * * *

UNITED STATES PATENT AND TRADEMARK OFFICE
CERTIFICATE OF CORRECTION

PATENT NO. : 9,867,326 B2
APPLICATION NO. : 14/649295
DATED : January 16, 2018
INVENTOR(S) : Yuanhua Dong et al.

Page 1 of 1

It is certified that error appears in the above-identified patent and that said Letters Patent is hereby corrected as shown below:

On the Title Page

The Assignee:
"INSTITUTE OF SCIENCE, CHINESE ACADEMY OF SCIENCES, Nanjing (CN)"

Should be changed to:
--INSTITUTE OF SCIENCE, CHINESE ACADEMY OF SCIENCES, Nanjing (CN); CHANGZHOU ZHONGKE CHANGTAI PLASMA TECHNOLOGY CO., LTD., Xinbei Changzhou (CN)--

Signed and Sealed this
Second Day of July, 2019

Andrei Iancu
*Director of the United States Patent and Trademark Office*